Dec. 4, 1951     M. M. WALLER     2,577,720
APPARATUS FOR THE PURIFICATION AND DRYING OF GASES
Filed July 16, 1947
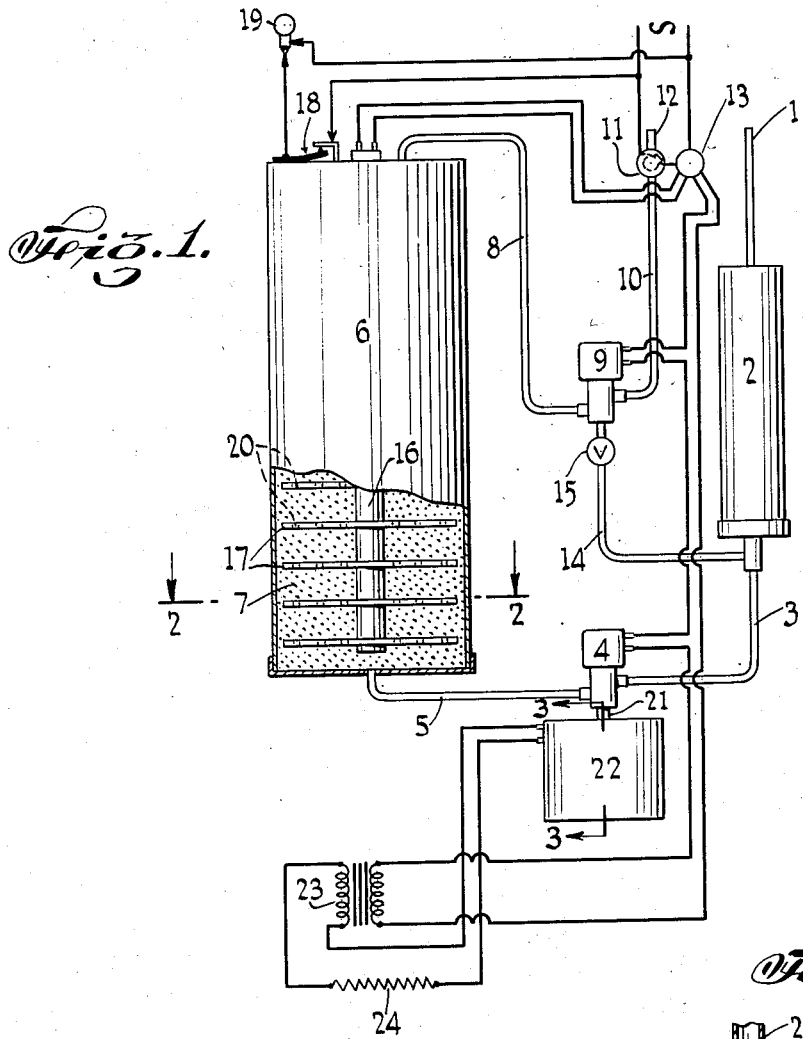
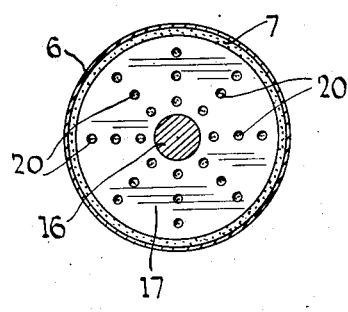
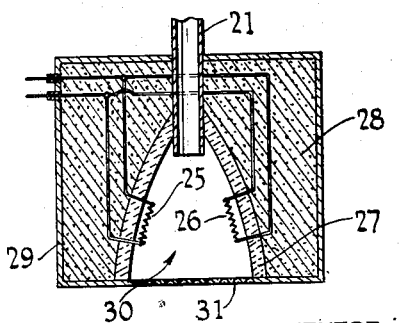
INVENTOR
MILTON M. WALLER
BY
ATTORNEY Patented Dec. 4, 1951

2,577,720

UNITED STATES PATENT OFFICE 2,577,720

APPARATUS FOR THE PURIFICATION AND DRYING OF GASES

Milton M. Waller, Plainfield, N. J., assignor to Baker & Co., Inc., Newark, N. J., a corporation of New Jersey Application July 16, 1947, Serial No. 761,304

6 Claims. (Cl. 23—260)

The present invention deals with an apparatus for the purification and drying of gases and relates in particular to the dehydration of a gaseous medium purified from oxygen or hydrogen.

There are instances where gases or gaseous mixtures used for industrial or technical purposes contain other gaseous impurities which are detrimental to the manufacture of high quality products or interfere with the achievement of the desired technical results. For example, in controlled atmosphere furnaces, bright annealing, heat treatment of alloys, powder metallurgy, hydrogenation, food processing, etc., it is desirable to have an atmosphere or gaseous medium free from oxygen or water vapor to a degree where only minute traces of such impurities are permissible. For other purposes, it is desired to have a gas or gaseous mixture substantially free from hydrogen.

Devices have been developed in an attempt to meet such technical and industrial requirements. Devices embodying the principle of catalytic combination of oxygen and hydrogen to purify a gaseous medium of either oxygen or hydrogen have been used, but such devices are complicated and cumbersome and contain a high temperature catalyst which necessitates the use of a heater to maintain the catalyst at an operable temperature. The catalytically purified gas contains an undesirable water content due to the water formed by the catalytic reaction in addition to the residual water content which may have been present in the gaseous medium prior to the purification. Such water content even in small amounts may be as detrimental as an oxygen content especially in processes utilizing high temperature atmospheres. Therefore, the purified gas is dehydrated by contacting the wet gas with a drying agent, e. g. silica gel or activated alumina, which adsorbs the moisture content of the gas. However, such drying agent becomes saturated and requires removal and replacement or reactivation for further efficient operation. The reactivation involves the elimination of the water content, which is usually accomplished by heating the dryer to vaporize the adsorbed water and passing a foreign gas, e. g. a gas not actually involved in the normal operation of the device, over the drying agent to convey the vaporized water out of the apparatus. Such foreign gas, i. e. air, is usually not desired as a constituent of the gas emerging from the purifying and drying device. Consequently, the device requires purging of the foreign gas from the system and such purging may be disadvantageously time-consuming. The introduction of a foreign gas may also require the provision of a source of such gas, which contributes to the cost of maintenance.

It is one object of this invention to provide an instrument capable of purifying a gaseous medium from an oxygen or hydrogen impurity and dehydrating the gaseous medium in the same instrument. It is another object of this invention to provide an instrument adapted to purify and dry a gaseous medium and to reactivate a dehydrating agent. It is a further object of this invention to provide a more efficient dehydration of catalytically purified gaseous media. It is a still further object of this invention to provide an instrument adapted to eliminate purging the dryer of foreign purging gas. It is still another object of this invention to provide an instrument that insures against contamination of a purified and dried gas by a foreign purging gas and which expels only water vapor or an inert gas or both to the surrounding atmosphere. Other objects and advantages of the invention will become more apparent from the description thereof hereinafter following.

The invention is illustrated in the accompanying drawings forming part hereof, in which:

Figure 1 represents a schematic diagram of a combined purifier and dryer unit and an electrical circuit therefor and a sectional view of the dryer chamber, Figure 2 illustrates a cross-sectional end view of the dryer chamber along the lines 2—2 of Figure 1, and Figure 3 illustrates an enlarged cross-sectional view of the converter along the lines 3—3 of Figure 1.

In Figure 1, a gaseous medium to be purified from the oxygen content and which may comprise hydrogen, nitrogen, helium, argon, neon, or saturated hydrocarbons, or mixtures of such gases, enters into the instrument of this invention through inlet pipe 1 into a catalytic reaction chamber 2, which is capable of combining oxygen with hydrogen at room temperature. A catalyst metal of platinum or palladium is deposited upon a suitable support, for instance on a refractory oxide carrier of aluminum oxide in dehydrated form, e. g. activated alumina, or a carrier of dehydrated zirconium dioxide, to provide the supported catalyst which is capable of converting oxygen and hydrogen to water at room temperature. The wet gaseous medium, purified of oxygen, flows out of the catalytic purifier through tube 3 into and through solenoid valve 4, which is normally in the open position to receive the purified wet gas and allow such gas to pass into tube 5, which leads to a lower portion of one end of the drying chamber 6. The tubes 3 and 5 constitute a conduit which conducts gas from the reaction chamber 2 to the bottom of the drying chamber. Contained within the dryer is a drying agent 7, e. g. a desiccant such as silica gel or activated alumina, which adsorbs the moisture from the wet gas as it passes through the dryer and, as a purified and dried gas, into the tube 8, which is connected into an upper portion of one end of the dryer. The purified and dried gas now passes into and through the solenoid valve 9, which is normally in the open position for the passage of the gas from the dryer, and through tube 10 and the valve 11 and out of the instrument through the outlet pipe 12.

The operation of the instrument may continue in this manner for a designated volume of a gaseous medium as established with regard to the volume of wet gas that the drying agent will dehydrate to an extent that the purified and dried gas emerging from the instrument will maintain a dew point of approximately minus 70° F. when such degree of dryness is required.

When the wet gas has saturated the drying agent to the point where the desired dew point cannot be maintained, the reactivation of the drying agent, involving the expulsion therefrom of the water content, is initiated by closing the valve 11. This valve shuts off the outlet of gas and at the same time closes an electric switch on the stem of valve 11 which is in series with the timer 13. The timer 13 is turned to the starting position which activates the solenoid valves 4 and 9. A change in the normal course of flow of the purified gas, which now becomes the purging gas, is initiated as soon as the timer 13 is turned to the starting position and the thereby activated solenoid valves are closed to the normal flow of gas and opened for a reversed reactivation flow so that the flow of gas is prevented from passing through the tube 3. The gas is allowed to pass from the catalytic purifier 2 into the tube 14 and into and through a flow regulating valve 15 which regulates the flow of the purging gas, which is the same gas used in the normal operation of the instrument. The purging gas flows into the dryer 6 via the solenoid valve 9, which is activated to allow the passage of purging gas through the tube 8 only, and then into the upper portion of one end of the dryer 6. The tubes 14 and 8 constitute a conduit which conducts gas from the reaction chamber 2 to the top of the drying chamber during the period of reactivation of the adsorbent.

At the same time that the timer 13 activates the solenoid valves 4 and 9, it also closes the electrical circuit to the heating element 16 which is supplemented with heating heating fins 17. During the initial stages of the passage of the wet purging gas through the dryer for reactivation, the heater element 16 and the heating fins 17 are in the process of heating the dryer 6 to an optimum reactivating temperature of for instance approximately 300°–400° F., and during such process, when the reactivation temperature has reached about 100° F., the thermostatic switch 18 is caused to open and break the circuit for the indicator light 19 which extinguishes the indicator light to show that that instrument is not in normal operation, but in the reactivation stage.

The heating fins 17 are particularly illustrated in Figure 2 and are shown to have a plurality of perforations 20 to more advantageously allow the passage of gas through the dryer.

The heat developed by the heating element 16 and the heating fins 17 causes the adsorbed water of the saturated drying agent to vaporize and such vaporized water passes out of the dryer with the purging gas and into tube 5, located at the lower portion of one end of the dryer. The water bearing purging gas flows through the activated solenoid valve 4, and through tube 21 only and into the converter 22.

After the purification of a gaseous medium from oxygen, the purified gas is advantageously used as the purging gas. However, such purging gas contains hydrogen and it may be undesirable to allow the hydrogen-bearing purging gas to leave the instrument and enter the surrounding atmosphere. Therefore, the converter 22 is provided to oxidize, e. g. by combination with air, the gas about to emerge into the atmosphere, so that only water vapor and possibly an inert gas emerges into the surrounding atmosphere through the converter 22.

Figure 3 shows the converter 22 in an enlarged cross-sectional view on the line B—B of Figure 1. At the initiation of the reactivation process, the transformer 23, which is in electrical series with the solenoid valves, reduces the voltage and passes the current through the resistance 24 to the two catalytic igniters 25 and 26 which are connected to the transformer circuit in parallel and which may comprise incandescent wires, for instance of platinum or platinum alloy, e. g. platinum-iridium, or any other material capable of igniting a combustible gas. The catalytic igniters are positioned on the surface of an inner shell 27, composed of a refractory material, where such igniters can come in contact with a combustible gas emerging from the tube 21. An insulating material 28 is used as a filler material between the refractory shell 27 and the inner container wall 29.

The wet purging gas flowing out of tube 21 enters the combustion chamber 30 where it comes in contact with the igniters which are so positioned that they do not come in direct contact with the flame caused by the ignited gas coming from tube 21.

Since the invention includes purification of a gaseous medium of oxygen or hydrogen under the formation of water, and since the above description particularly deals with the purification of a gaseous medium from oxygen, it will be obvious that one of the gaseous constituents entering the combustion chamber is hydrogen. Therefore, a gas comprising at least hydrogen and water vapor comes in contact with the igniters which burn the hydrogen and convert such hydrogen-containing gas, so that the only gas escaping into the surrounding atmosphere will be water vapor and possibly an inert gas if such inert gas is a constituent of the gaseous medium used in the process.

A wire screen 31 may be used to cover the exit of the converter combustion chamber.

The converter may also have substituted for the wire igniters any other catalytic means capable of converting the hydrogen emerging from tube 21 to water vapor.

When the gaseous medium is to be purified of hydrogen instead of oxygen, the gas passing into the converter comprises at least oxygen and water vapor. Oxygen or hydrogen may be added to the gaseous medium to be purified of oxygen or hydrogen depending upon which one is required to purify a gaseous medium of the other.

Although the instrument of this invention is especially suitable for the dehydration of a gaseous medium after the purification from either oxygen or hydrogen, it may also be utilized to dehydrate a gaseous medium which contains substantially no oxygen or hydrogen.

What I claim is:

1. A gas purifying apparatus comprising a first reaction chamber having an inlet and an outlet, a container for a desiccant and having at least two openings, a first gas conduit connecting said outlet to one of said openings, a second gas conduit connecting said outlet to another of said openings each of said conduits having a valve interposed between the ends thereof for opening and closing said conduits to the flow of gas from said reaction chamber to said container, conduit means independent of said gas conduits and associated with said valves for permitting gas to be expelled from each of said conduits through said valves, one of said valve conduits having connected thereto a second reaction chamber, said second reaction chamber having an inlet and an outlet, a catalytic wire secured in said chamber between said inlet and outlet, electrical conductors leading to said catalytic wire for electrically heating said catalytic wire.

2. A gas purifier comprising a reaction chamber having a gas inlet and a gas outlet, a catalyst within said reaction chamber to promote chemical reaction between the gas being purified and at least one of the impurities in said gas, a gas adsorbing chamber for removing at least one constituent from the gas which flows from said reaction chamber, a first opening in one end of said adsorbing chamber, a first conduit connecting said outlet to said first opening, a first valve in said first conduit, said first valve when set in one position permitting the flow of gas from the reaction chamber to the adsorbing chamber and when set in another position permitting the flow of gas from the adsorbing chamber to the atmosphere through a conduit associated with said first valve and independent of said first conduit, a second opening in the other end of the adsorbing chamber, a second conduit connecting said outlet to said second opening, a second valve in said second conduit, said second valve when set in one position permitting the flow of gas from the absorbing chamber to a point of use and when set in another position permitting the flow of gas from the reaction chamber to the adsorbing chamber, a second reaction chamber having an inlet and an outlet and said inlet connnected to said conduit associated with said first valve, a catalytic wire secured in said second reaction chamber between said inlet and outlet, electrical conductors leading to said catalytic wire for electrically heating said catalytic wire, and a heater for said adsorbing chamber.

3. Apparatus for treating gas comprising a reaction chamber, a drying chamber for containing a desiccant, means for heating said desiccant, said drying chamber having two spaced apart openings therein, a first gas conduit connecting said reaction chamber to one of said openings to convey gas from said reaction chamber to said drying chamber, a second gas conduit connecting said reaction chamber to the other of said openings to convey gas from said reaction chamber to said drying chamber, a first valve casing in said first conduit, said casing having an outlet port therein for conveying gas from said first conduit to the atmosphere, valve means in said casing movable to one position to permit flow of gas from said reaction chamber to said drying chamber and to simultaneously cut off flow of gas through said outlet port, said valve means being movable to another position to cut off flow of gas between said chambers and to simultaneously open said outlet port to permit flow of gas to the atmosphere, a second reaction chamber having an inlet and an outlet and said inlet connected to the outlet port of said first valve casing, a catalytic wire secured in said second reaction chamber between said inlet and outlet, electrical conductors leading to said catalytic wire for electrically heating said catalytic wires, a second valve casing in said second conduit, said second casing having an outlet port therein for conveying gas from said second conduit to a place of use for treated gas, valve means in said second casing movable to one position to permit flow of gas from said reaction chamber to said drying chamber and to simultaneously close said outlet port in said second casing, said valve means in said second casing being movable to another position to cut off flow of gas between said chambers and to simultaneously open said outlet port in said second casing to permit flow of gas from said second conduit to said place of use.

4. Apparatus for treating gas comprising a reaction chamber having an inlet and an outlet, a drying chamber for containing a desiccant, means for heating said desiccant, said drying chamber having two spaced apart openings therein, a first gas conduit connected to said outlet, a second gas conduit interconnecting said first gas conduit with one of said openings, a first valve casing in said second conduit, said valve casing having an outlet port for allowing flow of gas to the atmosphere, valve means in said casing movable to one position to allow gas to flow from said reaction chamber to said drying chamber and to simultaneously cut off passage of gas through said outlet port, said valve means being movable to another position to cut off communication between said chambers and to simultaneously establish communication between said drying chamber to the atmosphere through said outlet port, a second reaction chamber having an inlet and an outlet and said inlet connected to the outlet port of said first valve casing, a catalytic wire secured in said second reaction chamber between said inlet and outlet, electrical conductors leading to said catalytic wire for electrically heating said catalytic wires, a third gas conduit interconnecting said first gas conduit with the other of said openings, a second valve casing in said third conduit, said second valve casing having an outlet port for connection to a place of use for treated gas, valve means in said second casing movable to one position to allow gas to flow from said reaction chamber to said drying chamber and to simultaneously cut off passage of gas through said outlet port in said second valve casing, said valve means in said second casing being movable to another position to cut off communication between said chambers and to simultaneously establish communication between said drying chamber to said place of use through said outlet port in said second valve casing.

5. Apparatus according to claim 4 and including means interconnecting each of said valve means for moving said valve means in said first valve casing to its said other position at the same time that said valve means in said second valve casing is moved to its said one position and vice versa.

6. Apparatus according to claim 4 and including a gas burner connected to said outlet port in said first valve casing for burning gas expelled from said second conduit.

MILTON M. WALLER.

REFERENCES CITED

The following references are of record in the file of this patent:

UNITED STATES PATENTS

| Number | Name | Date |
|---|---|---|
| 1,667,316 | Hartman et al. | Apr. 24, 1928 |
| 1,979,820 | Bowling | Nov. 6, 1934 |
| 1,986,814 | Hartman | Jan. 8, 1935 |
| 2,210,862 | Tronstad | Aug. 6, 1940 |
| 2,270,025 | Rukoff | Jan. 13, 1942 |
| 2,314,827 | Hortvet | Mar. 23, 1943 |
| 2,384,065 | Balcar | Sept. 4, 1945 |
| 2,417,558 | Laird et al. | Mar. 18, 1947 |

OTHER REFERENCES

Mellor: "Inorg. and Theo. Chem.," vol. 1, 1922, page 487.

"The Story of Silica Gel," The Silica Gel Corporation (1930), Patterson, ed., page 9.